United States Patent
Lurk et al.

(10) Patent No.: US 9,976,677 B2
(45) Date of Patent: May 22, 2018

(54) DUAL USE COUPLING END FOR PIPES AND FITTINGS

(71) Applicant: ULTRAFLO CORPORATION, Ste. Genevieve, MO (US)

(72) Inventors: Michael James Lurk, Sainte Genevieve, MO (US); Thomas A. Linhorst, Perryville, MO (US)

(73) Assignee: ULTRAFLO CORPORATION, Ste. Genevieve, MO (US)

( * ) Notice: Subject to any disclaimer, the term of this patent is extended or adjusted under 35 U.S.C. 154(b) by 235 days.

(21) Appl. No.: 14/216,001

(22) Filed: Mar. 17, 2014

(65) Prior Publication Data

US 2014/0284922 A1    Sep. 25, 2014

Related U.S. Application Data

(60) Provisional application No. 61/799,052, filed on Mar. 15, 2013.

(51) Int. Cl.
*F16L 37/20* (2006.01)
*F16L 21/06* (2006.01)
(Continued)

(52) U.S. Cl.
CPC .............. *F16L 21/06* (2013.01); *F16L 37/18* (2013.01); *F16L 41/021* (2013.01); *F16L 55/1157* (2013.01)

(58) Field of Classification Search
CPC ......... F16L 21/06; F16L 41/021; F16L 37/18; F16L 55/1157
(Continued)

(56) References Cited

U.S. PATENT DOCUMENTS

| 2,478,586 | A | * | 8/1949 | Krapp | ..................... | F16L 37/18 |
| | | | | | | 285/312 |
| 3,409,316 | A | * | 11/1968 | Jewell | ..................... | F16L 37/20 |
| | | | | | | 285/311 |

(Continued)

OTHER PUBLICATIONS

Bulk Tank, Inc., Hopper tees should empty material. Not fill you with frustration., 2011, 1 page, Bulk Tank, Inc., Hills, MO, United States of America Park.

*Primary Examiner* — Brian Glessner
*Assistant Examiner* — Joshua Ihezie
(74) *Attorney, Agent, or Firm* — Oathout Law Firm; Mark A. Oathout (57) ABSTRACT

The disclosure relates to a dual use coupling end including a pipe section having an annular recessed cam groove a distance from an annular endwardly facing surface of the pipe section, the cam groove defined by a curved or tapered cam groove surface extending gradually radially inwardly from an annular radial outer surface of the fitting adjacent toward the endwardly facing surface, to an annular clamp groove terminating on an opposite end by a radially outwardly extending annular clamp abutment surface located a distance from the endwardly facing surface. The clamp abutment surface extends a distance radially outwardly from the radial innermost portion to an annular beveled cam abutment surface at an acute angle to the clamp abutment surface and facing radially outwardly from the endwardly facing surface, the cam abutment surface disposed radially outwardly of the cam groove surface and including a radial outward discontinuous extension.

23 Claims, 7 Drawing Sheets

(51) Int. Cl.
  *F16L 37/18* (2006.01)
  *F16L 41/02* (2006.01)
  *F16L 55/115* (2006.01)

(58) Field of Classification Search
  USPC ...... 285/33, 88, 311, 312, 87, 365, 407, 320
  See application file for complete search history.

(56) References Cited

U.S. PATENT DOCUMENTS

| | | | | |
|---|---|---|---|---|
| 3,633,948 A * | 1/1972 | Dickey | ............... | F16L 57/06 285/148.13 |
| 4,059,296 A * | 11/1977 | Panourgias | ............. | F16L 37/18 285/312 |
| 4,295,670 A * | 10/1981 | Goodall | ................. | F16L 37/18 285/312 |
| 4,519,635 A * | 5/1985 | McMath | ................ | F16L 37/18 285/312 |
| 4,575,130 A * | 3/1986 | Pemberton | ............. | F16L 37/18 141/349 |
| 4,802,694 A * | 2/1989 | Vargo | ...................... | F16L 37/18 285/312 |
| 5,005,876 A * | 4/1991 | Fahl | ........................ | F16L 37/18 285/311 |
| 5,042,850 A * | 8/1991 | Culler | ...................... | F16L 37/18 285/312 |
| 5,295,717 A * | 3/1994 | Chen | ....................... | F16L 37/18 285/312 |
| 5,378,023 A * | 1/1995 | Olbrich | ................. | B21D 39/04 285/24 |
| 5,433,163 A * | 7/1995 | McKiernan | ............ | B63B 13/00 114/382 |
| 5,540,465 A | 7/1996 | Sisk | | |
| 5,676,404 A | 10/1997 | Sisk | | |
| 5,722,666 A | 3/1998 | Sisk | | |
| 5,842,681 A * | 12/1998 | Sisk | .................... | B65D 90/623 137/614.06 |
| 5,988,693 A * | 11/1999 | Street | ..................... | F16L 37/18 285/312 |
| 6,543,812 B1 * | 4/2003 | Chang | .................... | F16L 37/18 285/312 |
| 6,786,362 B2 | 9/2004 | Sisk | | |
| 7,093,862 B2 * | 8/2006 | Muto | .................. | B21D 39/048 285/179 |
| 7,523,963 B2 * | 4/2009 | Draper | ................... | F16L 21/06 285/312 |
| 8,091,925 B2 | 1/2012 | Sisk | | |
| D673,657 S | 1/2013 | Sisk | | |
| D678,471 S | 3/2013 | Sisk | | |
| D678,472 S | 3/2013 | Sisk | | |
| D678,473 S | 3/2013 | Sisk | | |
| D678,474 S | 3/2013 | Sisk | | |
| D678,475 S | 3/2013 | Sisk | | |
| 9,194,522 B2 * | 11/2015 | Dzolovic | ................ | F16L 37/18 |
| 2005/0012328 A1 * | 1/2005 | Baving | ............... | F16L 37/0925 285/242 |
| 2010/0320758 A1 | 12/2010 | Sisk | | |
| 2012/0038148 A1 | 2/2012 | Sisk | | |
| 2012/0241657 A1 | 9/2012 | Sisk | | |
| 2012/0261602 A1 | 10/2012 | Sisk | | |
| 2013/0076021 A1 | 3/2013 | Sisk | | |
| 2013/0168956 A1 | 7/2013 | Sisk | | |
| 2013/0307262 A1 | 11/2013 | Sisk | | |
| 2014/0084581 A1 * | 3/2014 | Sisk | ....................... | F16L 37/18 285/312 |
| 2014/0210203 A1 * | 7/2014 | Lorkowsi | ............ | F16L 37/096 285/88 |

* cited by examiner

DUAL USE COUPLING END FOR PIPES AND FITTINGS

BACKGROUND

Technical Field

This disclosure relates generally to a coupling end for a pipe or fitting, for joining to another pipe or fitting, and more particularly, to a coupling end adapted for use with a clamp style coupler or a cam and groove style coupler.

Couplers are well known for use in joining pipes in sealed relation to other pipes, tees, hoses, and other fittings, to provide a continuous sealed passage for the flow of fluids, including both liquids and solids, such as, but not limited to, chemicals, food products, and particulates such as cement, sand, etc. Such couplers are commonly used in piping systems on bulk materials transports and hoppers, for conveying fluid carried thereby. Desirable feature of such couplers include the ability to quick and easy couple and uncouple, to enable disassembly of pipes or removal of pipes from tees and the like, for purposes such as inspection, cleaning and repair. For instance, after travel to a delivery site and unloading, it may be required to uncouple the pipes of a transport or hopper for cleaning and preparing for transporting a different material. Or, it may be found that a pipe has become clogged, so as to require uncoupling for removal of the clog. Or a coupler gasket may be damaged or otherwise leaking, so as to require replacement.

Reference, Sisk U.S. Pat. Nos. 5,540,465 and 5,722,666, which disclose well known clamp type couplers, usable for coupling pipes and a variety of fittings.

Typically, pipes and fittings include annular grooves of rectangular cross section about the ends thereof to be coupled, which grooves are configured for receiving annular ribs or flanges of the coupler, when the ends of the pipes and fittings are in abutting relation, for capturing the coupler gasket between the ribs and preventing longitudinal movement between the coupled pipes and fittings, as illustrated in FIGS. 7 and 8 of the above referenced Sisk U.S. Pat. Nos. 5,540,465 and 5,722,666. This manner of coupling continues in use, as illustrated in more recent Sisk U.S. Pat. No. 8,091,925. The rectangular coupler grooves are generally standard in size and are a standard distance from the end of the pipe or fitting. As also illustrated in the Sisk patents, the pipes and fittings to be coupled include smooth annular surfaces between the grooves and the ends to be coupled, to provide a good sealing interface with the annular gasket of the coupler which is compressed against the smooth surfaces when the coupler is closed.

Another standardized, commonly used and well known coupler for pipes and fittings such as tees and the like, is a cam and groove type coupler. Reference in this regard, Fahl, U.S. Pat. No. 5,005,876, and Sisk Design Pat. No. D673, 657. The cam and groove coupler differs from the above referenced clamp style by the provision of a more rounded groove about the pipe or fitting, located a standard distance from the end. In this coupler, the gasket is typically contained in a cavity of a female receptacle that receives the pipe or fitting end, and the receptacle will have rounded eccentric cams at spaced locations about the receptacle that extend into the cavity and are eccentrically pivotable using external levers attached thereto. When the pipe or fitting end is received in the receptacle and abuts the gasket, the cams are eccentrically pivoted by moving the levers to extend a greater distance into the cavity to occupy the groove and engage the rounded surfaces of the pipe or fitting bounding the groove. Force can be exerted against the levers to load the cams in a direction for urging the end of the pipe or fitting against the gasket for forming a better sealed condition.

Both clamp style and cam and groove style couplers are extremely well known and have been widely used for many years. However, they have previously not been directly interchangeable. When it has been desired to use one with a pipe or fitting have the groove for the other, an adapter has been required. This is undesirable as it adds complexity and cost.

Accordingly, what is sought is a manner of coupling pipes and/or fittings using either a clamp style or cam and groove style coupler, that overcomes one or more of the problems and shortcomings set forth above.

BRIEF SUMMARY

What is disclosed is a dual use coupling end for pipes and/or fittings using either a clamp style or cam and groove style coupler, that overcomes one or more of the problems and shortcomings set forth above.

According to a preferred aspect of the disclosed embodiments, the dual use coupling end includes a tubular pipe section that can be the end of a pipe fitting, pipe or adapter, having an annular recessed cam groove thereabout spaced a predetermined distance from an annular endwardly facing surface of the pipe section, the cam groove being defined by a curved or tapered cam groove surface extending gradually radially inwardly from an annular radial outer surface of the fitting adjacent toward the endwardly facing surface, to an annular clamp groove terminating on an opposite end by a radially outwardly extending substantially annular clamp abutment surface located a predetermined distance from the endwardly facing surface. The clamp abutment surface extends a predetermined distance radially outwardly from the radial innermost innermost portion to an annular beveled cam abutment surface oriented at an acute angle to the clamp abutment surface and facing radially outwardly and away from the endwardly facing surface, the cam abutment surface being disposed substantially radially outwardly of the cam groove surface and comprising a radial outward discontinuous extension thereof.

As a result, the cam groove and the clamp groove are essentially coexistent, providing the ability for securely and sealably coupling with either a conventional cam groove type pipe coupler or clamp type coupler.

According to another preferred aspect of the disclosed embodiments, in use with a conventional cam groove type coupler, the gasket will abut the endwardly facing surface and the cams of the coupler will locate in the cam groove, bearing against the cam groove surface, and the cam abutment surface. Particularly, bearing against the cam abutment surface generates an endwardly directed force component for holding the gasket against the endwardly facing surface. In use with a conventional clamp type coupler the annular rib of the coupler will be received in the annular clamp groove so as to be retained in position on the pipe section by the clamp abutment surface. A gasket of the coupler will be brought to bear about the radial outer surface of the tubular pipe section between the cam abutment surface and the endwardly facing surface.

BRIEF DESCRIPTION OF THE FIGURES

FIGS. 2A and 2B are side views of a dual use coupling end of FIG. 1.

DETAILED DESCRIPTION OF THE PREFERRED EMBODIMENT(S)

Figure 1:
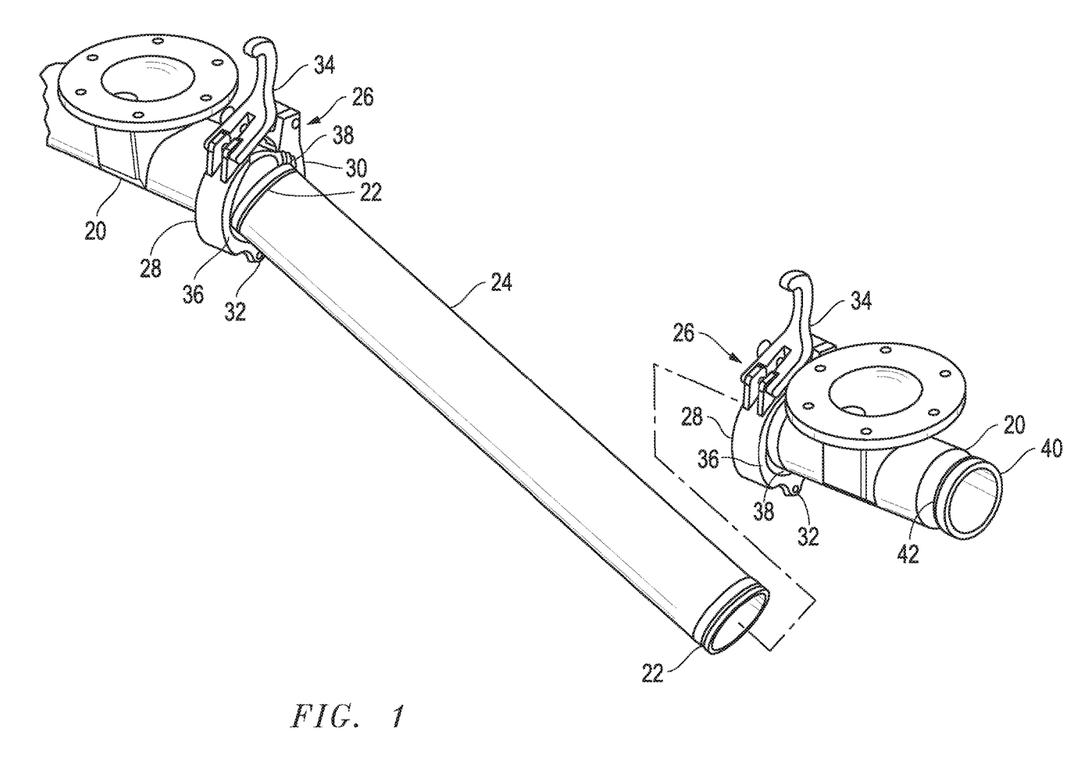
FIG. 1 is a simplified side view of a representative pipe coupler application for a dual use coupling end according to the teachings of the disclosure.
Figure 2A:
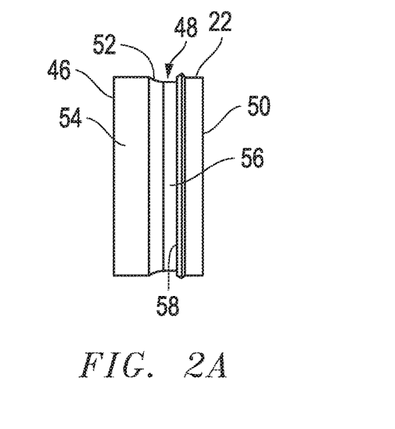
Figure 2B:
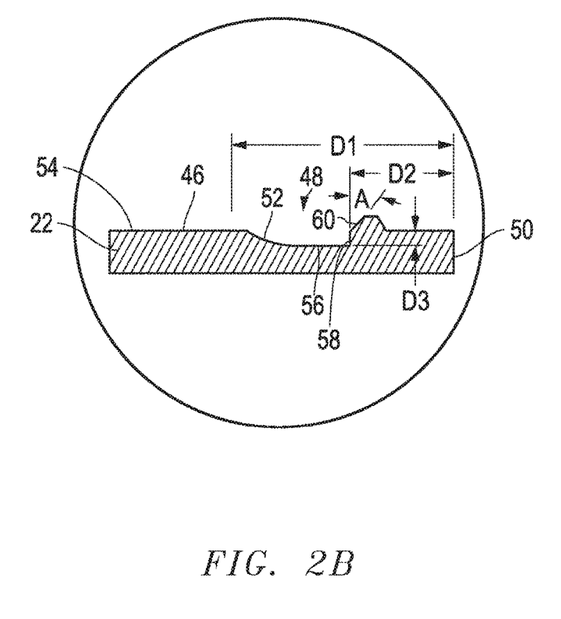
FIG. 2B is an enlarged view in section of FIG. 2A.

Referring to FIG. 1, a representative application for dual use coupling ends 22 of the embodiments is shown, which is typical of a multiple compartment pneumatic bulk transport application, including multiple pipe tees 20 connectable in pneumatically sealed relation to coupling ends 22 of a pipe 24. Here, standard clamp type couplers 26 are illustrated in position for joining the pipe to the tees. Alternatively, and at other coupling ends, it may be desired to use a standard cam groove type coupler, as illustrated in later FIGS., as made possible by the dual use capability of the embodiment. Clamp type coupler 26 generally includes a first semi-circular element 28, and a second semi-circular element 30 (FIG. 6), connected for relative hinged movement by a hinge joint 32. Elements 28 and 30 include second end portions which are brought together when the elements are hingedly closed in the well known conventional manner, and include elements of a clamping mechanism 34 operable for securing the coupler about pipe ends, or a pipe end and a fitting, to be coupled together.

As is well-known, semi-circular elements 28 and 30 each have a generally C-shaped cross-sectional shape including spaced apart ribs 36 (FIG. 6) defining a cavity receiving a gasket 38, such that, as coupler 26 is closed about the coupling end, a positive controlled or measured compressive force will be exerted to form a sealed condition thereabout, to prevent escape of the pneumatic contents.

Figure 8:
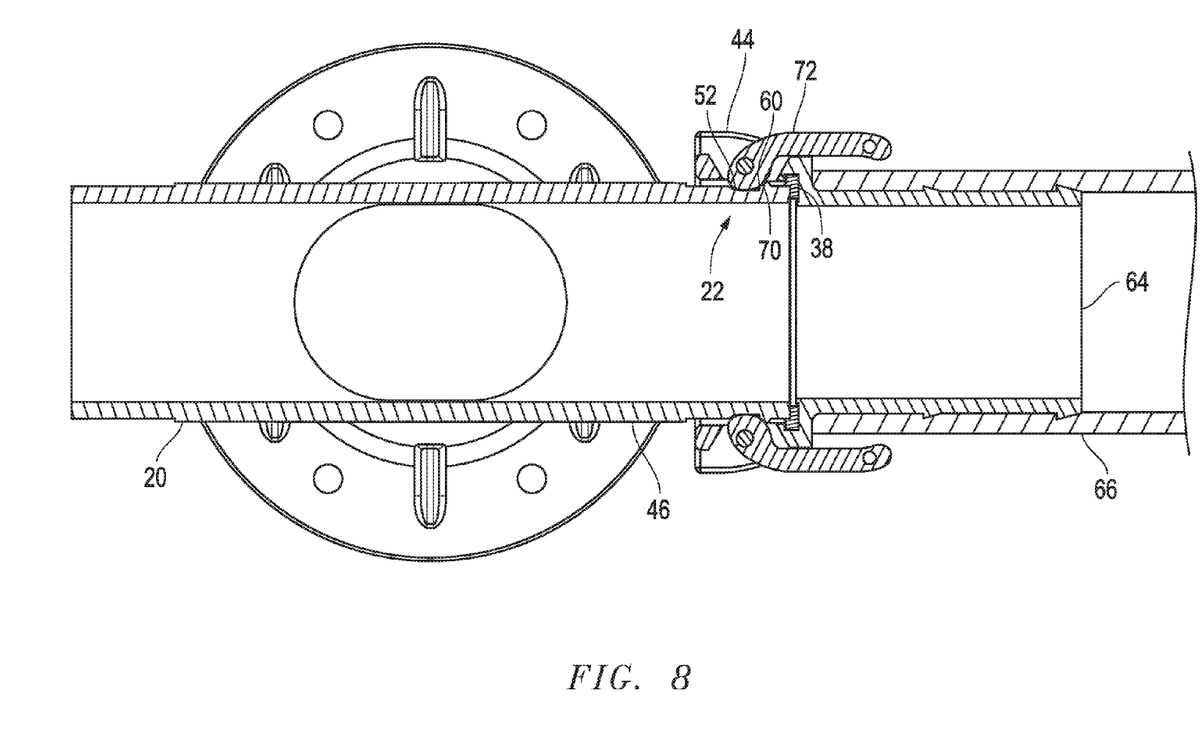
FIG. 8 is a sectional bottom view of a pipe tee including a dual use coupling end, with a standard cam groove type coupler thereabout joining a hose nipple and associated hose thereto.
Figure 9:
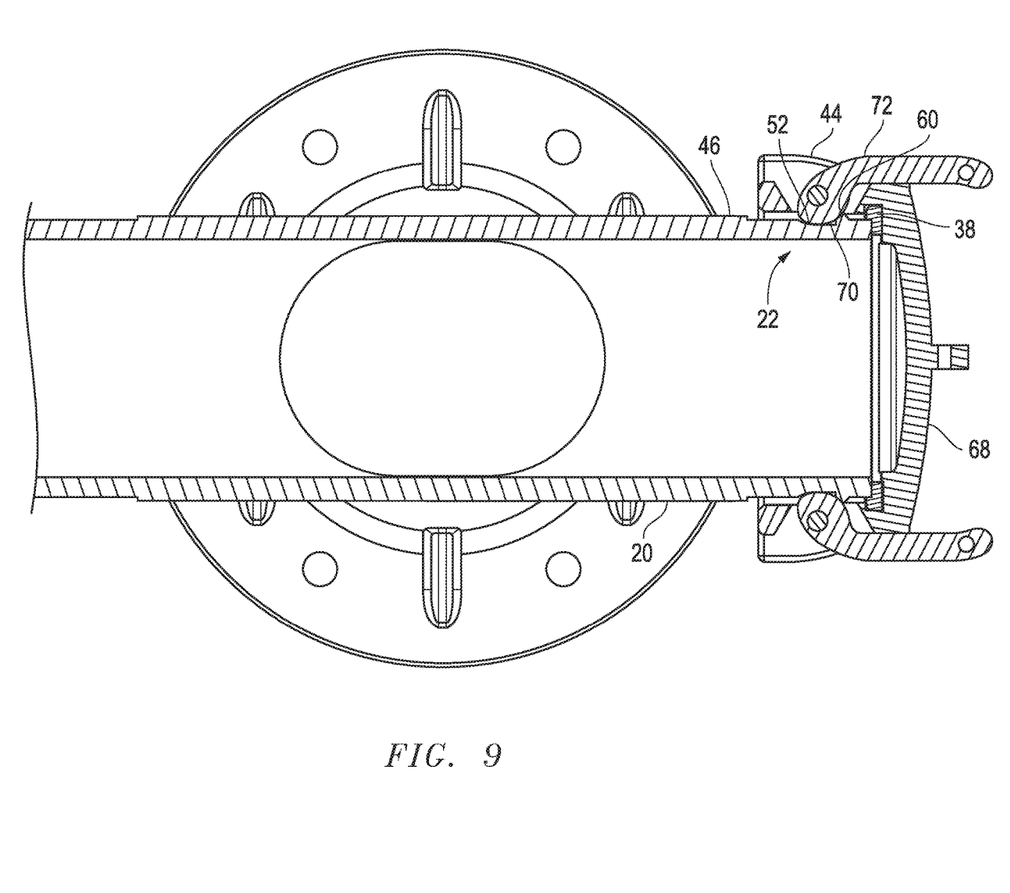
FIG. 9 is another sectional bottom view of the pipe tee including the dual use coupling end, with a standard cam groove type coupler thereabout holding a cap thereto.

A standard clamp type coupling end 40 is shown on one end of the right hand pipe tee 20. Coupling end 40 has an standard clamp coupler groove, coupler groove, or annular groove 42 thereabout of rectangular sectional shape configured in position for receiving a rib 36 of a coupler, such as a coupler 26, which will abut or be located in closely spaced relation to the end surface of the groove closest to the end of the pipe, to retain pipe 24, in the well-known manner. As is well-known, coupling ends 40 including grooves 42 for use with clamp type couplers are not compatible with other type coupler mechanisms, particularly a cam groove coupler 44, such as illustrated in FIGS. 8 and 9.

Referring also to FIGS. 2A-2B and 3A-B, dual use coupling end 22 of the embodiment is incorporated on a tubular pipe section 46 that can be the end of a pipe fitting, pipe or adapter, and includes an annular recessed cam groove 48 thereabout spaced a predetermined distance D1 from an annular endwardly facing surface 50 of the pipe section, cam groove 48 being defined by a curved (e.g. concave) or tapered cam groove surface 52 extending gradually radially inwardly from an annular radial outer surface 54 of pipe section 46 toward the endwardly facing surface 50, to an annular clamp groove terminating on an opposite end by a radially outwardly extending substantially annular clamp abutment surface 58 located a predetermined distance D2 from endwardly facing surface 50. Clamp abutment surface 58 extends a predetermined distance D3 radially outwardly from the radial innermost portion of cam groove surface 52 in clamp groove 56 to an annular beveled cam abutment surface 60 oriented at an acute angle A to clamp abutment surface 58 and facing radially outwardly and away from endwardly facing surface 50, cam abutment surface 60 being disposed substantially radially outwardly of cam groove surface 52 on an annular protuberance and comprising a radial outward discontinuous extension of surface 52, clamp groove 56 being interposed therebetween.

As a result, cam groove 48 and clamp groove 56 are essentially coexistent, providing the ability for securely and sealably coupling with either a conventional cam groove type pipe coupler 44 or clamp type coupler 26, as variously illustrated in FIGS. 6-9.

Figure 3A:
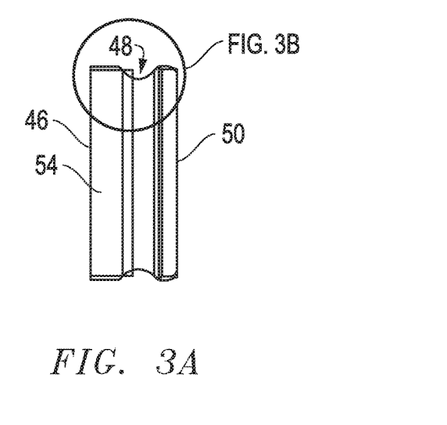
FIG. 3A is a side view of the dual use coupling end, superimposed with a standard cam groove and standard clamp coupler groove.
Figure 3B:
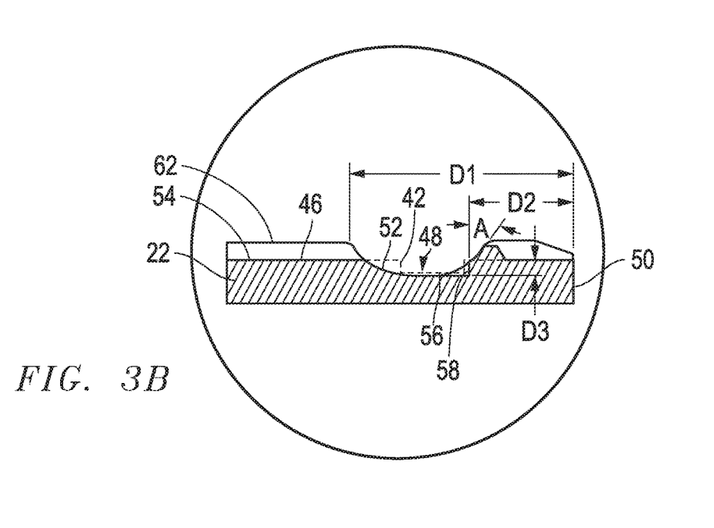
FIG. 3B is an enlarged view in section of FIG. 3A.
Figure 4:
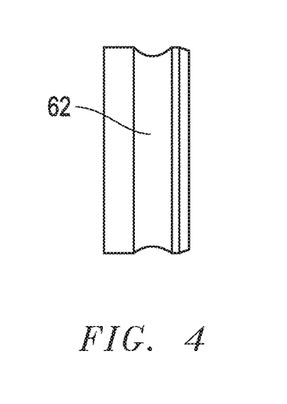
FIG. 4 is a side view of the standard cam groove.

Referring also to FIG. 4, a standard cam groove coupling end 62 is shown, for use with a standard cam groove coupler 44 in the well known manner. The profile shape of end 62 is overlayed on coupling end 22 in the enlargement of FIG. 3B.

Figure 5:
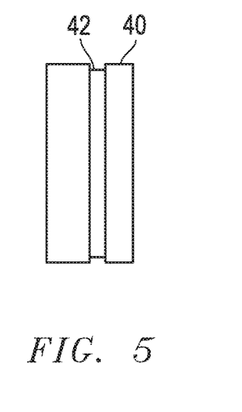
FIG. 5 is a sectional view of the standard clamp coupler groove.

Referring also to FIG. 5, a standard clamp type coupling end 40 including a coupler groove 42, is shown, and is overlayed in the FIG. 3B enlargement.

Figure 6:
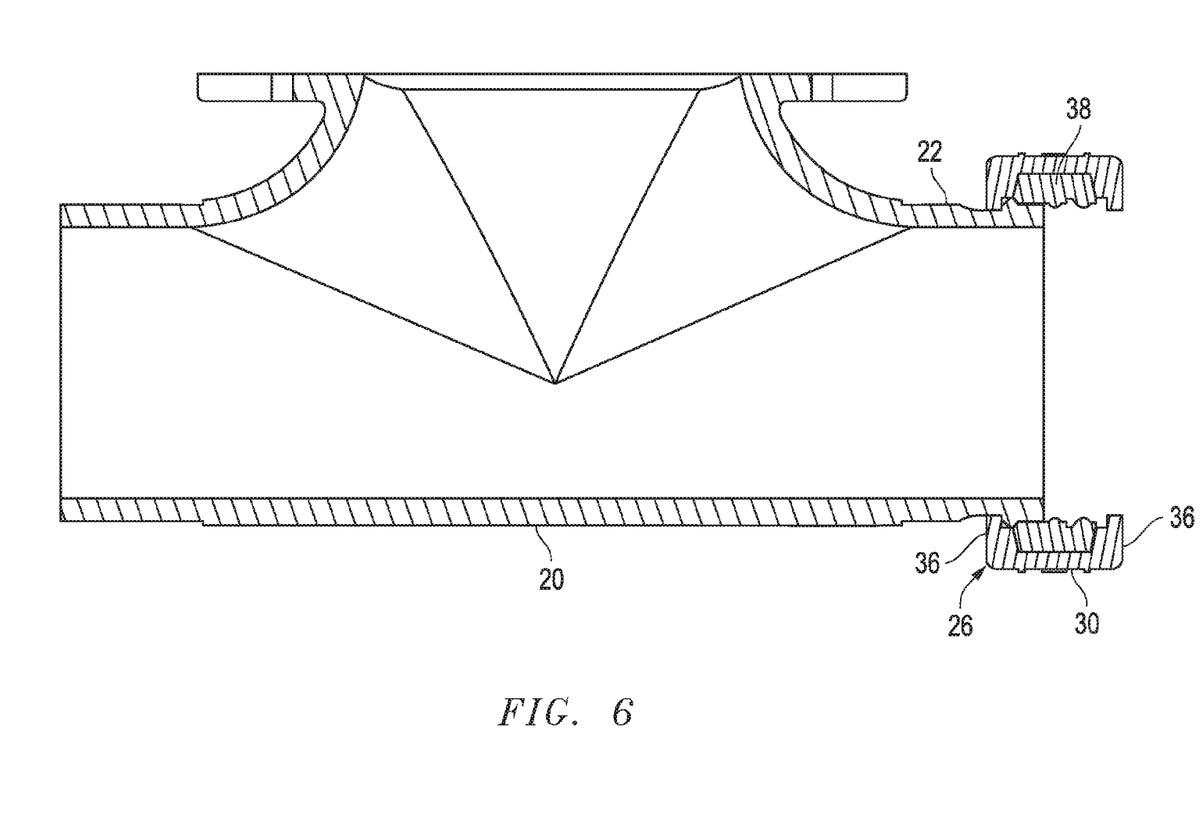
FIG. 6 is a sectional side view of a pipe tee with a dual use coupling end with a standard clamp type coupler thereabout.
Figure 7:
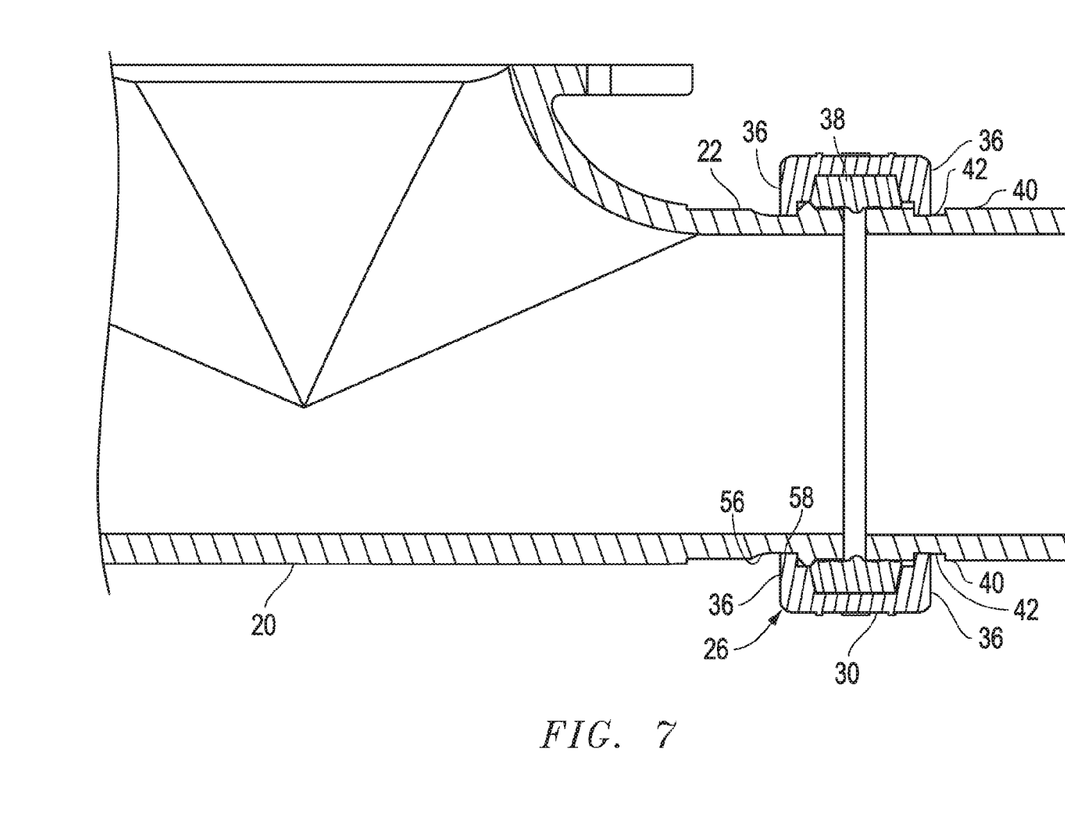
FIG. 7 is another sectional side view of the pipe tee with the dual use coupling end and standard clamp type coupler thereabout, coupling to a pipe having a standard clamp type coupling end.

In FIGS. 6 and 7, it can be observed that a coupling end 22 on pipe section 46 of a tee 20 is couplable to a standard clamp type coupler 26, with associated rib 36 of the coupler located in clamp groove 56 and in surface to surface abutment or opposing relation to clamp abutment surface 58. In FIG. 7 coupler 26 is shown conventionally clamped about coupling end 40 with that associated rib 36 located in coupler groove 42.

In FIGS. 8 and 9, it can be observed that coupling end 22 on pipe section 46 of tee 20 is coupled to a standard cam groove coupler 44, with cam surface 70 of the coupler bearing against cam groove surface 52 and cam abutment surface 60, when cam lock 72 is in a closed position as illustrated. Here, it should be understood that by rotation of cam lock 72 in a counterclockwise direction, cam surface 70 will be withdrawn from surfaces 52 and 60 to release the coupler. It can also be observed that cam abutment surface 60 is positioned at an angle to allow cam surface 70 to bear thereagainst in a direction toward the end of the pipe section, for exerting a compressive force against the gasket 38. In FIG. 8, coupler 44 is coupled to a hose nipple type fitting 64, having a hose 66 attached thereto in the conventional manner. In FIG. 9, a cap 68 is coupled. It can thus be observed that surfaces 52 and 60 are related in a manner to provide the essential elements of a conventional standard cam groove 62, for equal utility, but interrupted by a clamp groove 56, which provides the dual use capability of the embodiment, thus enabling interchangeable use of either type of clamp.

In light of all the foregoing, it should thus be apparent to those skilled in the art that there has been shown and described a novel dual use coupling end. However, it should also be apparent that, within the principles and scope of the disclosure, many changes are possible and contemplated, including in the details, materials, and arrangements of parts which have been described and illustrated to explain the nature of the disclosure. Thus, while the foregoing description and discussion addresses certain preferred embodiments or elements of the disclosure, it should further be understood that concepts of the disclosure, as based upon the foregoing description and discussion, may be readily incorporated into or employed in other embodiments and constructions without departing from the scope of the disclosure. Accordingly, the following claims are intended to protect the disclosure broadly as well as in the specific form shown, and all changes, modifications, variations, and other uses and applications which do not depart from the spirit and scope of the disclosure are deemed to be covered by the disclosure, which is limited only by the claims which follow.

The invention claimed is:

1. A dual use coupling end for a pipe or fitting, comprising:
the pipe or fitting defining a dual use groove about an annular radial outer surface of a tubular end portion of the pipe or fitting, spaced a predetermined distance from an annular endwardly facing surface of the end portion configured to be held in sealed relation to a mating annular endwardly facing surface of another pipe or fitting, the dual use groove being bound and defined by a tapered or curved substantially annular cam groove surface beginning at a first predetermined distance from the endwardly facing surface and extending radially into the end portion so as to gradually reduce an overall diameter thereof toward the endwardly facing surface, terminating at an annular clamp groove portion bound and defined on one end by a radially outwardly extending substantially annular clamp abutment surface oriented about perpendicular to a proximal portion of the cam groove surface closest thereto, located at a second predetermined distance less than the first predetermined distance from the endwardly facing surface, the clamp abutment surface extending a predetermined distance radially outwardly from the annular clamp groove portion to an annular beveled cam abutment surface oriented at an acute angle to the clamp abutment surface, facing radially outwardly and in an opposite direction from the endwardly facing surface and disposed substantially radially outwardly relative thereto, in predetermined relation to the cam groove surface.

2. The dual use coupling end of claim 1, wherein the cam groove surface and the cam abutment surface are configured and positioned to simultaneously engage at least one cam of a cam groove coupler when coupled about the coupling end.

3. The dual use coupling end of claim 1, wherein the cam abutment surface is located on a radially outwardly extending annular protuberance extending about the coupling end.

4. The dual use coupling end of claim 3, further comprising an annular seal surface about the coupling end between the protuberance and the endwardly facing surface.

5. The dual use coupling end according to claim 1, wherein the tapered or curved substantially annular cam groove surface is a concave substantially annular cam groove surface.

6. A pipe, comprising:
an end portion having a dual use groove thereabout, spaced a predetermined distance from an annular endwardly facing surface of the end portion configured to be held in sealed relation to a mating annular endwardly facing surface of another pipe or a fitting, the dual use groove being bound and defined by a tapered or curved substantially annular cam groove surface beginning at a first predetermined distance from the endwardly facing surface and extending radially into the end portion so as to gradually reduce an overall diameter thereof toward the endwardly facing surface, terminating at an annular clamp groove portion bound and defined on one end by a radially outwardly extending substantially annular clamp abutment surface oriented about perpendicular to a proximal portion of the cam groove surface closest thereto, located at a second predetermined distance less than the first predetermined distance from the endwardly facing surface, the clamp abutment surface extending a predetermined distance radially outwardly from the annular clamp groove portion to an annular beveled cam abutment surface oriented at an acute angle to the clamp abutment surface, facing radially outwardly and in an opposite direction from the endwardly facing surface and disposed substantially radially outwardly relative thereto, in predetermined relation to the cam groove surface.

7. The pipe according to claim 6, wherein the tapered or curved substantially annular cam groove surface is a concave substantially annular cam groove surface.

8. The pipe of claim 6, wherein the cam groove surface and the cam abutment surface are configured and positioned to simultaneously engage at least one cam of a cam groove coupler when coupled about the dual use groove of the end portion.

9. The pipe of claim 6, wherein the cam abutment surface is located on a radially outwardly extending annular protuberance extending about the dual use groove of the end portion.

10. The pipe of claim 9, further comprising an annular seal surface about the coupling end between the protuberance and the endwardly facing surface, configured for sealingly engaging a gasket of a clamp coupler when coupled thereabout.

11. A pipe fitting, comprising
a tubular end portion having a dual use groove thereabout, spaced a predetermined distance from an annular endwardly facing surface of the end portion configured to be held in sealed relation to a mating annular endwardly facing surface of another fitting or a pipe, the dual use groove being bound and defined by a tapered or curved substantially annular cam groove surface beginning at a first predetermined distance from the endwardly facing surface and extending radially into the end portion so as to gradually reduce an overall diameter thereof toward the endwardly facing surface, terminating at an annular clamp groove portion bound and defined on one end by a radially outwardly extending substantially annular clamp abutment surface oriented about perpendicular to a proximal portion of the cam groove surface closest thereto, located at a second predetermined distance less than the first predetermined distance from the endwardly facing surface, the clamp abutment surface extending a predetermined distance radially outwardly from the proximal portion of the cam groove surface to an annular beveled cam abutment surface oriented at an acute angle to the clamp abutment surface, facing radially outwardly and away from the endwardly facing surface and disposed substantially radially outwardly relative thereto, in predetermined relation to the cam groove surface.

12. The pipe fitting of claim 11, wherein the cam groove surface and the cam abutment surface are configured and positioned to simultaneously engage at least one cam of a cam groove coupler when coupled about the coupling end.

13. The pipe fitting of claim 11, wherein the cam abutment surface is located on a radially outwardly extending annular protuberance extending about the coupling end.

14. The pipe fitting of claim 13, further comprising an annular seal surface about the coupling end between the protuberance and the endwardly facing surface, configured for sealingly engaging a gasket of a clamp coupler when coupled thereabout.

15. The pipe fitting of claim 11, comprising a tee.

16. The pipe fitting of claim 11, comprising an adapter.

17. The pipe fitting of claim 11, comprising an elbow.

18. A dual use coupling end of a pipe fitting, comprising:
a tubular end portion having an annular recessed cam groove thereabout spaced a predetermined distance from an annular endwardly facing surface of the end portion configured to be held in sealed relation to a mating annular endwardly facing surface of another pipe fitting or a pipe, the cam groove being defined by a curved or tapered cam groove surface extending gradually radially inwardly from an annular radial outer surface of the fitting adjacent to the coupling end, toward the endwardly facing surface, terminating at a radial inner surface portion comprising an annular clamp groove bound and defined on an opposite end by a radially outwardly extending substantially annular clamp abutment surface oriented about perpendicular to the radial inner surface portion of the cam groove surface, located at a predetermined distance from the endwardly facing surface, the clamp abutment surface extending a predetermined distance radially outwardly from the annular clamp groove portion to an annular beveled cam abutment surface oriented at an acute angle to the clamp abutment surface, facing radially outwardly and in an opposite direction from the endwardly facing surface and disposed substantially radially outwardly relative thereto, in predetermined relation to the cam groove surface.

19. The coupling end of claim 18, wherein the pipe fitting comprises a portion of a pipe tee.

20. The coupling end of claim 18, wherein the pipe fitting comprises an end of a pipe.

21. The dual use coupling end according to claim 18, wherein the curved or tapered cam groove surface is a concave cam groove surface.

22. A dual use coupling end for a pipe or pipe fitting, comprising:
a tubular pipe section having an annular recessed cam groove thereabout spaced a predetermined distance from an annular endwardly facing surface of the pipe section, the cam groove being defined by a curved or tapered cam groove surface extending gradually radially inwardly from an annular radial outer surface of the fitting adjacent toward the endwardly facing surface, to an annular clamp groove bound and defined in the tubular pipe section and terminating on an opposite end by a radially outwardly extending substantially annular clamp abutment surface located a predetermined distance from the endwardly facing surface, the clamp abutment surface extending a predetermined distance radially outwardly from the annular clamp groove portion to an annular beveled cam abutment surface oriented at an acute angle to the clamp abutment surface and facing radially outwardly and in an opposite direction from the endwardly facing surface, the cam abutment surface being disposed substantially radially outwardly of the cam groove surface and comprising a radial outward discontinuous extension thereof.

23. The dual use coupling end according to claim 22, wherein the curved or tapered cam groove surface is a concave cam groove surface.

* * * * *